(12) United States Patent
Cawthorne et al.

(10) Patent No.: US 9,440,737 B1
(45) Date of Patent: Sep. 13, 2016

(54) APPARATUS TO ADJUST AIRFOILS OF ROTOR BLADES

(75) Inventors: Matthew H. Cawthorne, Wayne, PA (US); Robert P. Narducci, Glen Mills, PA (US); Perry Ray Ziegenbein, Glassboro, NJ (US)

(73) Assignee: THE BOEING COMPANY, Chicago, IL (US)

( * ) Notice: Subject to any disclaimer, the term of this patent is extended or adjusted under 35 U.S.C. 154(b) by 696 days.

(21) Appl. No.: 13/469,790

(22) Filed: May 11, 2012

(51) Int. Cl.
*B64C 27/467* (2006.01)
*B64C 27/615* (2006.01)
*F03D 7/02* (2006.01)

(52) U.S. Cl.
CPC ........... *B64C 27/467* (2013.01); *B64C 27/615* (2013.01); *F03D 7/0232* (2013.01); *Y02T 50/166* (2013.01); *Y02T 50/34* (2013.01)

(58) Field of Classification Search
CPC ... B64C 27/467; B64C 27/615; Y02T 50/34; F03D 7/0232
USPC .......................................... 416/23, 62, 146 R
See application file for complete search history.

(56) References Cited

U.S. PATENT DOCUMENTS

| | | | |
|---|---|---|---|
| 2,430,948 A | 11/1947 | Platt | |
| 3,237,697 A | 3/1966 | Ford et al. | |
| 3,952,601 A | 4/1976 | Galli et al. | |
| 4,789,305 A | 12/1988 | Vaughen | |
| 5,058,837 A * | 10/1991 | Wheeler | B64C 23/06 244/198 |
| 5,239,468 A | 8/1993 | Sewersky et al. | |
| 5,273,398 A | 12/1993 | Reinfelder et al. | |
| 5,492,448 A * | 2/1996 | Perry et al. | 416/62 |
| 7,097,427 B2 | 8/2006 | Kuhns et al. | |
| 8,043,053 B2 * | 10/2011 | Bernhard | 416/1 |
| 2008/0145219 A1 * | 6/2008 | McVeigh et al. | 416/23 |
| 2010/0028151 A1 * | 2/2010 | Loftus et al. | 416/144 |
| 2010/0047070 A1 * | 2/2010 | Slot et al. | 416/146 R |

FOREIGN PATENT DOCUMENTS

DE 3210498 A * 10/1983

* cited by examiner

*Primary Examiner* — Richard Edgar
*Assistant Examiner* — Brian P Wolcott
(74) *Attorney, Agent, or Firm* — Hanley, Flight & Zimmerman, LLC

(57) ABSTRACT

Apparatus to adjust airfoils of rotor blades are disclosed. An example apparatus includes a first surface to be attached to a trailing edge of a rotor blade; a forward edge having a first thickness; an aft edge having a second thickness; and a middle portion between the forward edge and the aft edge having a third thickness greater than the first and second thicknesses.

23 Claims, 7 Drawing Sheets

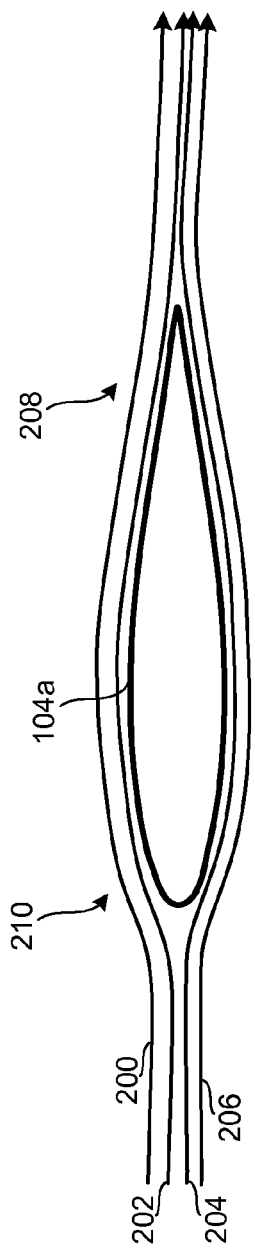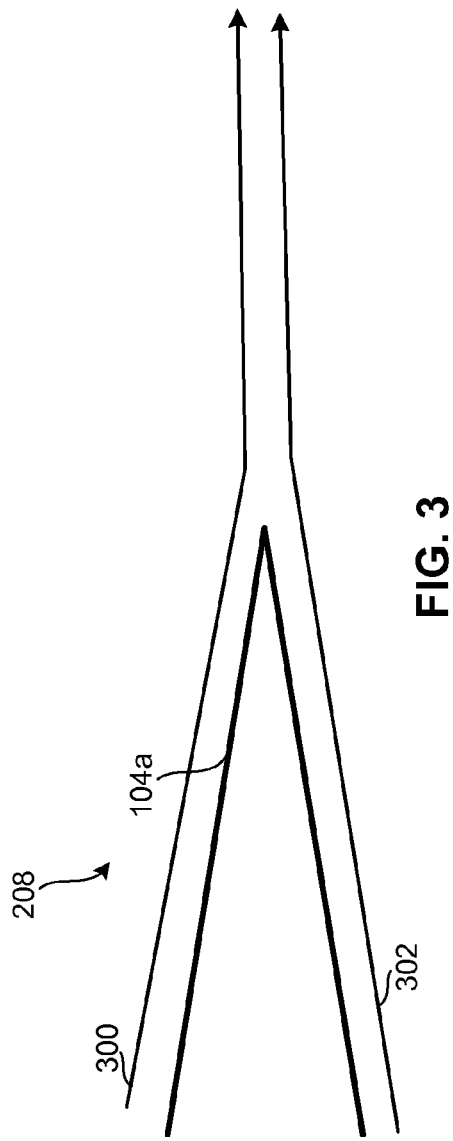

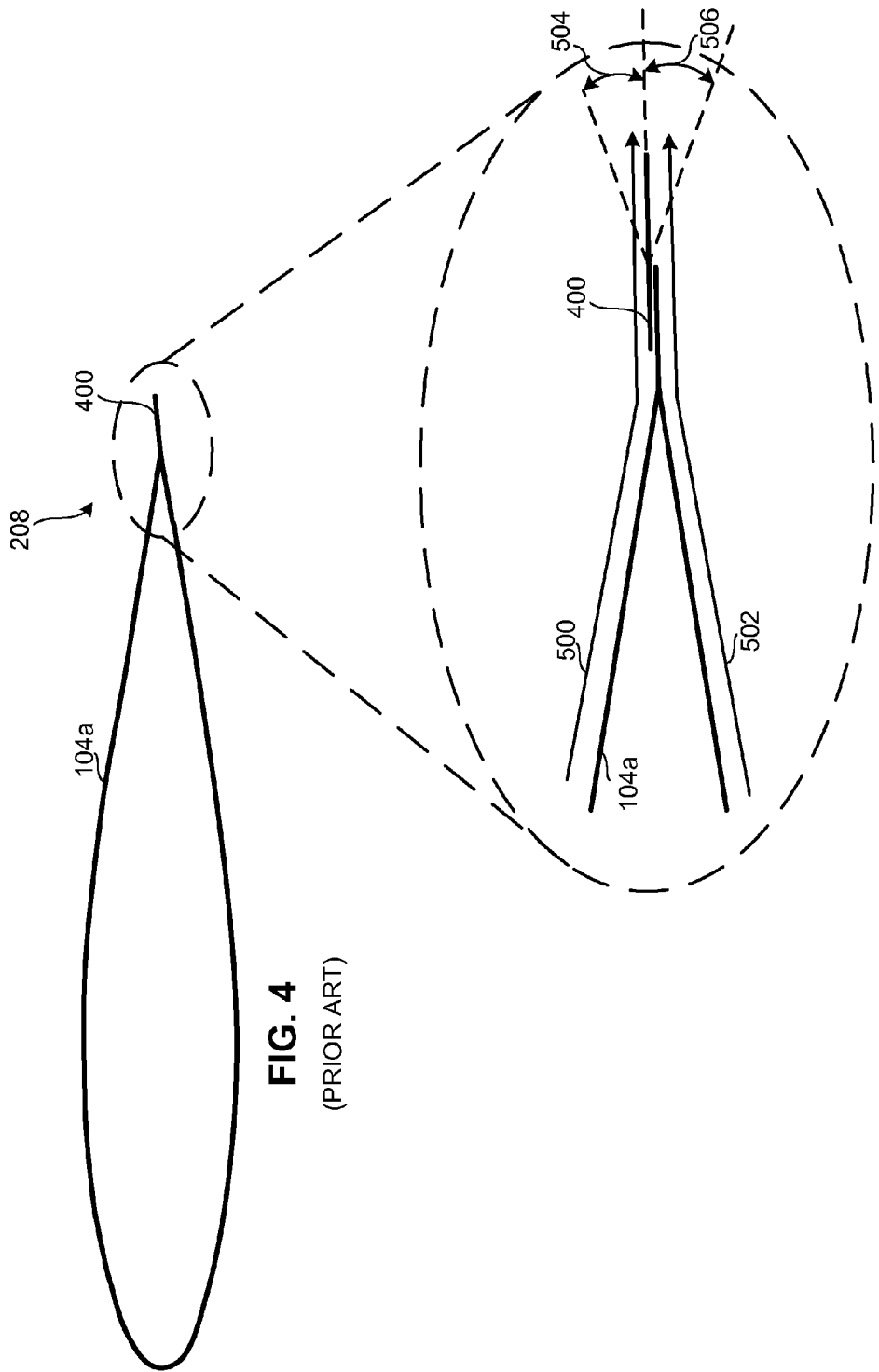

APPARATUS TO ADJUST AIRFOILS OF ROTOR BLADES

FIELD OF THE DISCLOSURE

This disclosure relates generally to rotor blades and, more particularly, to apparatus to adjust airfoils of rotor blades.

BACKGROUND

Some machines, such as helicopters, hovercraft, and watercraft, employ one or more rotor blades coupled to a rotor. To provide lift and/or thrust to such machines, the rotor drives a rotation of the rotor blades. Other machines, such as wind turbines, use rotor blades to drive a rotation of a rotor. Operation of machines utilizing rotor blades is improved when tracking paths or planes of rotation of the rotor blades are aligned with each other. Proper alignment of the tracking paths provides benefits including, for example, reduced vibration and extended operational life of the rotor blades.

Trim tabs or wedges are sometimes used to adjust and/or stabilize a tracking path of a rotor blade. In such instances, a trim tab or a wedge is attached to a trailing edge of the rotor blade to alter one or more aerodynamic characteristics of the rotor blade.

SUMMARY

Apparatus to adjust airfoils of rotor blades are disclosed. A disclosed example apparatus to adjust an airfoil of a rotor blade includes a first surface to be attached to a trailing edge of a rotor blade; a forward edge having a first thickness; an aft edge having a second thickness; and a middle portion between the forward edge and the aft edge having a third thickness greater than the first and second thicknesses.

A disclosed example rotor blade includes a first surface tapered towards an end of a trailing edge of the rotor blade; and a second surface opposite the first edge tapered towards the end at a first angle over a first portion of the second surface, the second surface being tapered away from the end at a second angle over a second portion of the second surface, and the second surface being tapered towards the end at a third angle over a third portion of the second surface.

A disclosed example adjustment device to alter an airfoil of a rotor blade includes means for adjusting a pitching moment characteristic of a rotor blade; and means for reducing an effect on a drag characteristic of the rotor blade created by the means for adjusting the pitching moment, the means for adjusting forming a first surface of the adjustment device and the means for reducing forming a second surface of the adjustment device.

BRIEF DESCRIPTION OF THE DRAWINGS

FIG. 2 is a cross-sectional view of the example rotor blade of FIG. 1.

FIG. 3 is a cross-sectional view of a trailing edge of the example rotor blade of FIGS. 1 and/or 2.

FIG. 4 is a cross-sectional view of the example rotor blade of FIGS. 1-3 having a trim tab coupled to the trailing edge of the rotor blade.

FIG. 5 is a magnified view of a portion of FIG. 4 including the trim tab coupled to the trailing edge of the example rotor blade of FIG. 4.

Figure 1:
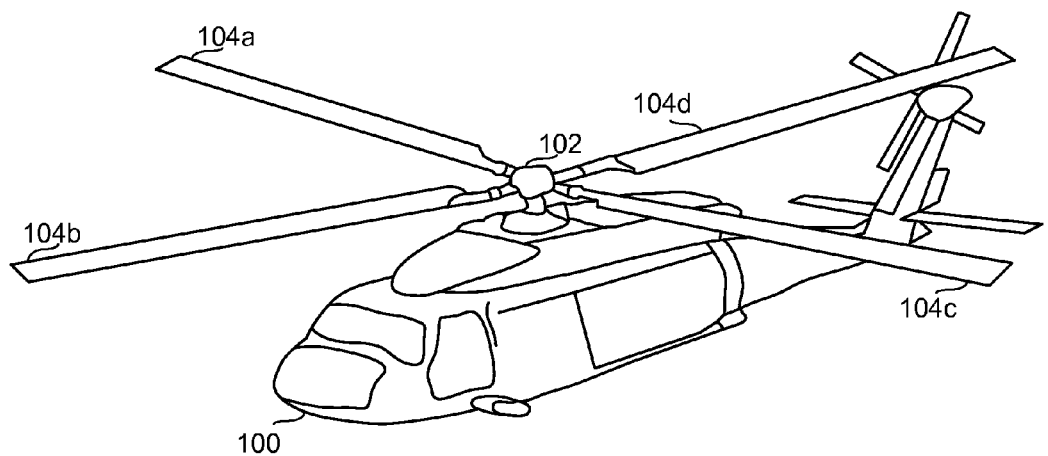
FIG. 1 is an illustration of an example rotocraft.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this patent, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

FIG. 1 shows an example machine in which example methods and apparatus disclosed herein may be utilized. While example methods and apparatus disclosed herein are described in connection with FIG. 1, examples disclosed herein may be implemented in connection with any type of machine or device having rotor blades, such as watercraft, hovercraft, wind turbines, etc. FIG. 1 shows a helicopter 100 having a rotor 102 that drives a plurality of rotor blades 104. The rotor 102 spins the blades 104 to provide the helicopter 100 with lift and/or thrust. As the blades 104 spin through air, each one of the blades 104 rotates along a tracking path or plane of rotation. The amount of lift and/or thrust provided by each one of the blades 104 and the tracking path traveled by each one of the blades 104 depends on a plurality of aerodynamic characteristics of the respective blade. For example, each one of the blades 104 has a particular airfoil, a pitching moment, a weight distribution, a twist, a chord length, etc. The shape of the rotor blades 104 dictate the manner in which air flows over (and under) the rotor blades 104 which, in turn, dictate the aerodynamic characteristics of the rotor blades 104.

FIG. 2 illustrates an airfoil of one of the rotor blades 104a and the manner in which air flows over the rotor blade 104a. The example of FIG. 2 includes a plurality of airflow lines 200-206 indicative of directions or paths taken by the air over and under the rotor blade 104a as the rotor blade 104a travels through the air. The airfoil of the rotor blade 104a converges to a point at a trailing edge 208 of the rotor blade 104a. The trailing edge 208 of the blade 104a is opposite a leading edge 210 that leads the trailing edge 208 when the blade 104a rotates. The airfoil determines several aerodynamic aspects or characteristics of the rotor blade 104a such as, for example, a pitching moment of the rotor blade 104a and the drag incurred by the rotor blade 104a. Thus, a change to the airfoil of the rotor blade 104a causes changes to those aerodynamic characteristic(s).

FIG. 3 is a magnified view of the trailing edge 208 of the example rotor blade 104a of FIG. 2 including airflow lines 300 and 302 to indicate a manner in which air flows at the trailing edge 208 of the rotor blade 104a. The airflow over the trailing edge 208 of the rotor blade 104a contributes to the drag profile of the airfoil. In other words, the portion of the airfoil at the trailing edge 208 of the rotor blade 104a influences the amount of drag (e.g., form drag) incurred by the rotor blade 104a. Thus, a change to the airfoil of the rotor blade 104a at the trailing edge 208 has an effect on the drag (e.g., as measured by a drag coefficient) incurred by the rotor blade 104a. As shown by the airflow lines 300 and 302 of FIG. 3, the airfoil of the rotor blade 104a, which has a trailing edge converging at a point, creates a relatively low amount of form drag.

In some instances, adjustments to the characteristic(s) of the rotor blades 104 are desired and/or needed. For example, although the helicopter 100 of FIG. 1 is likely constructed with blades of the same design and manufacturing process, minor variations between the blades 104 are inevitable due to, for example, wear and tear, manufacturing tolerances, material inconsistencies, etc. Even minor variations between characteristics of the individual blades 104 cause the tracking paths of the blades 104 to differ with respect to each other. Additionally, even though the tracking paths of the blades 104 may be aligned at one point in time, the blades 104 can fall out of alignment due to changing characteristics of the blades 104 from wear and tear, unintended rearrangements or shifts during operation, vibrations, rotor functionality, etc. If such discrepancies between the tracking paths of the rotor blades are present, an operator of the helicopter 100 (e.g., a maintenance engineer, a designer, etc.) needs to adjust characteristic(s) (e.g., an airfoil and, thus, a pitching moment) of one or more of the rotor blades 104 to place the planes of rotation of the blades 104 in alignment. Further, the need or desire to adjust the characteristic(s) of the rotor blades 104 may arise from reasons other than the tracking paths being misaligned. For example, the operator of the helicopter 100 may wish to adjust an airfoil of one or more of the rotor blades 104 to change the amount of lift and/or thrust provided by the rotor blades 104.

Mechanisms exist to aid in the realignment of the tracking paths of the rotor blades 104. For example, fixed and/or adjustable tabs sometimes assist in, for example, an alignment or realignment of the tracking paths of rotor blades. FIGS. 4 and 5 illustrate an example adjustable trim tab 400 mounted to the trailing edge 208 of the example rotor blade 104a of FIGS. 1-3. Alternatively, the trim tab 400 may be integrally formed with the rotor blade 104 such that the trim tab 400 is an extension of the trailing edge 208 of the rotor blade 104a. In some examples, the rotor blade 104a additionally or alternatively includes other type(s) of tabs, such as a fixed tab mounted or integrally formed with the trailing edge 208 of the rotor blade 104a.

The example trim tab 400 of FIGS. 4 and 5 is rigidly adjustable from a base position to a plurality of angular positions (e.g., relative to a reference line of the rotor blade 104a, such as the chord line of the airfoil). When the example trim tab 400 is in the base position shown in FIG. 5 (e.g., straightened), air flows over (and under) the rotor blade 104a according to air flow lines 500 and 502 of FIG. 5. As shown in FIG. 5, the trim tab 400 can be adjusted in a first direction to a first angle 504 or in a second direction to a second angle 506. Bending of the trim tab 400 changes the rotor blade shape, thereby altering the aerodynamic characteristics of the rotor blade 104a. When the trim tab 400 is bent upward relative to a base position (e.g., zero degrees) as shown with the angle labeled 504 in FIG. 5, the airfoil pitches upward. As a result, the airfoil tracks with a greater angle of attack in comparison to the same airfoil having the trim tab 400 in the base position. In the context of a rotor blade, the angle of attack refers to an angle between a chord of an airfoil of the rotor blade and a line representing undisturbed relative airflow surrounding the rotor blade. The greater angle of attack enables the rotor blade 104a to generate more lift and cause the rotor blade 104a to track in a higher relative plane. When the trim tab 400 is bent downward relative to the base position as shown with the angle labeled 506 in FIG. 5, the airfoil pitches downward. As a result, the airfoil tracks with a less angle of attack in comparison to the same airfoil having the trim tab 400 in the base position. The smaller angle of attack enables the rotor blade 104a to generate less lift and cause the rotor blade 104a to track in a lower relative plane. Thus, to bring the blades 104 of the helicopter 100 in track, the angular position of the trim tab(s) 400 is adjusted to stabilize the tracking paths of the respective rotor blades 104 along a desired common plane of rotation.

Figure 6:
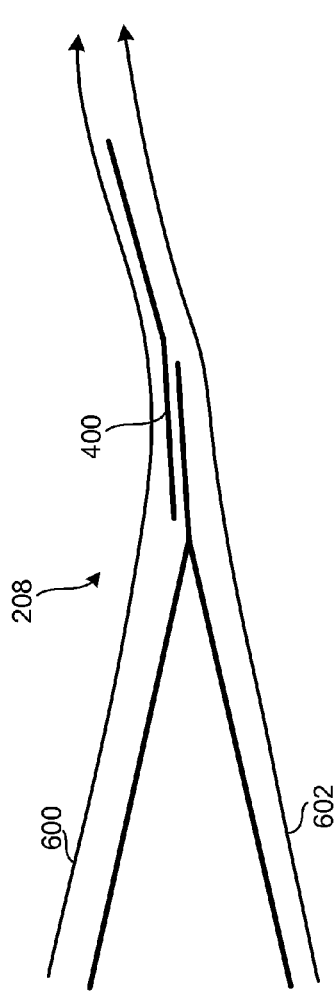
FIG. 6 is a cross-sectional view of the trailing edge of the example rotor blade of FIGS. 4 and/or 5.

While useful for altering the angle of attack of the rotor blade 104, the trim tab 400 of FIGS. 4 and 5 can only be bent to a certain degree without affecting the structural integrity of the rotor blade 104a. Further, the angle at which the trim tab 400 is placed may be large enough to, for example, incur aerodynamic separation and/or increase drag. That is, the example trim tab 400 can cause unwanted effect(s) on the drag profile of the rotor blade 104a. FIG. 6 illustrates the airflow characteristics of the rotor blade 104a having the trim tab 400. In particular, FIG. 6 includes airflow lines 600 and 602 representative of the manner in which air flows over the trailing edge 208 of the rotor blade 104a when the trim tab 400 is mounted to the trailing edge of the rotor blade 104a. The airflow lines 600 and 602 of FIG. 6 are different from the airflow lines 500 and 502 of FIG. 5. The differences in airflow between the rotor blade 104a with and without large trim tab angles alter the drag profile of the rotor blade 104a. Thus, when bent to alter the angle of attack of the rotor blade 104a, the trim tab 400 also changes the drag profile of the rotor blade 104a. In most instances, increased drag is an unwanted consequence.

Figure 7:
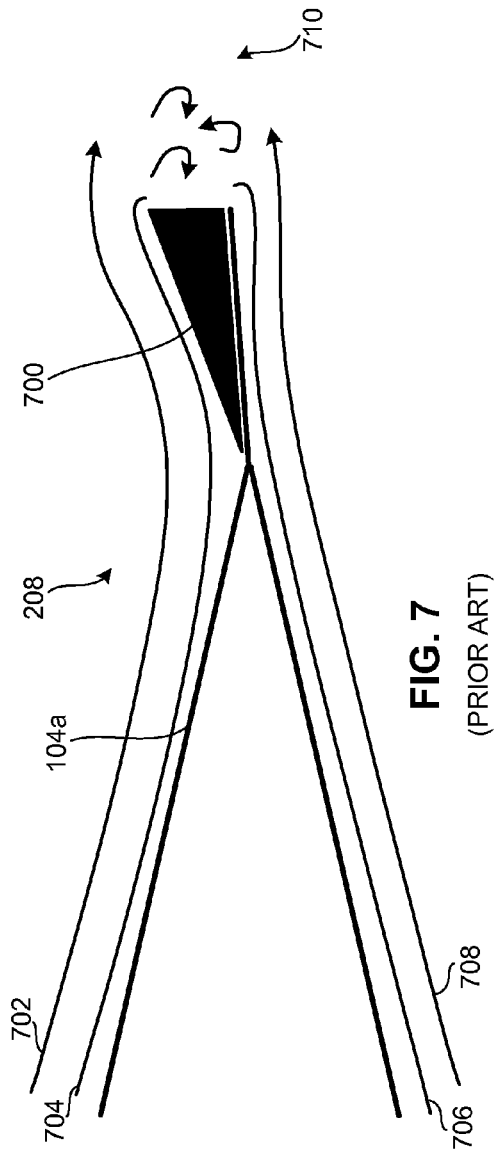
FIG. 7 is a cross-sectional view of the trailing edge of the example rotor blade of FIGS. 1-3 having a wedge coupled to the trailing edge of the rotor blade.

Another mechanism sometimes used to realign tracking paths of the rotor blades 104 is a wedge. FIG. 7 illustrates an example wedge 700 mounted to the trailing edge 208 of the rotor blade 104a. While the wedge 700 of FIG. 7 enables an operator of the helicopter 100 to alter the airfoil and, thus, the pitching moment of the rotor blade 104a, the wedge 700 also increases the drag incurred by the rotor blade 104a. As shown by airflow lines 702-710 in FIG. 7, the wedge 700 introduces a separation of airflow that increases the drag of the rotor blade 104a.

Figure 8:
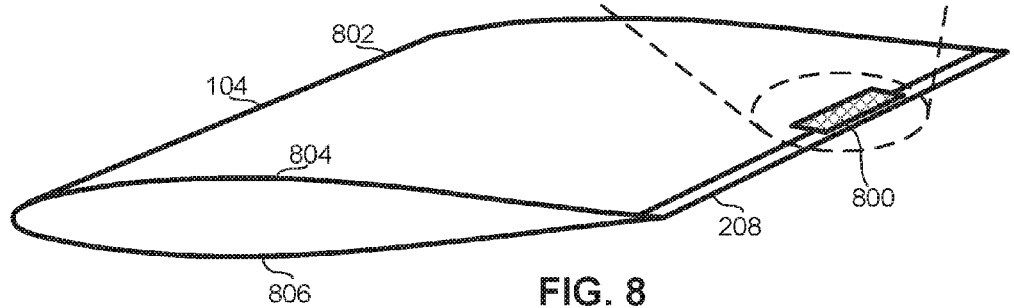
FIG. 8 is an illustration of an example airfoil adjustment device constructed in accordance with teachings of this disclosure coupled to the trailing edge of the example rotor blade of FIG. 1.

Example adjustment devices disclosed herein enable adjustments to the airfoil of the rotor blades 104 without creating additional flow separation at a trailing edge (e.g., base drag) and increasing drag incurred by the rotor blade 104a. FIG. 8 illustrates an example adjustment device 800 constructed in accordance with the teachings of this disclosure. The example adjustment device 800 is formed from any suitable material such as, for example, plastic, ceramic, metal, etc. When the example adjustment device 800 of FIG. 8 is used in connection with the rotor blades 104 of the example helicopter 100 of FIG. 1, the adjustment device 800 is mounted to the trailing edge 208 of the rotor blades 104. The example adjustment device 800 is mountable to the rotor blades 104 via, for example, adhesive(s), fastener(s) (e.g., bolt(s), screw(s), etc.), connector(s), plate(s), etc. In the illustrated example, the trailing edge 208 and a leading edge 802 are at opposite ends of the rotor blade 104a The example adjustment device 800 is mountable to the outer surfaces of the rotor blades 104 at the trailing edge 208. In an orientation corresponding to expected operation (e.g., while flying), the rotor blades 104 have an upper surface 804 and a bottom surface 806. The example adjustment device 800 is mountable to either one of the upper surface 804 and the bottom surface 806 depending on, for example, the manner in which the operator wishes to change the airfoil of the corresponding rotor blade 104.

Figure 9:
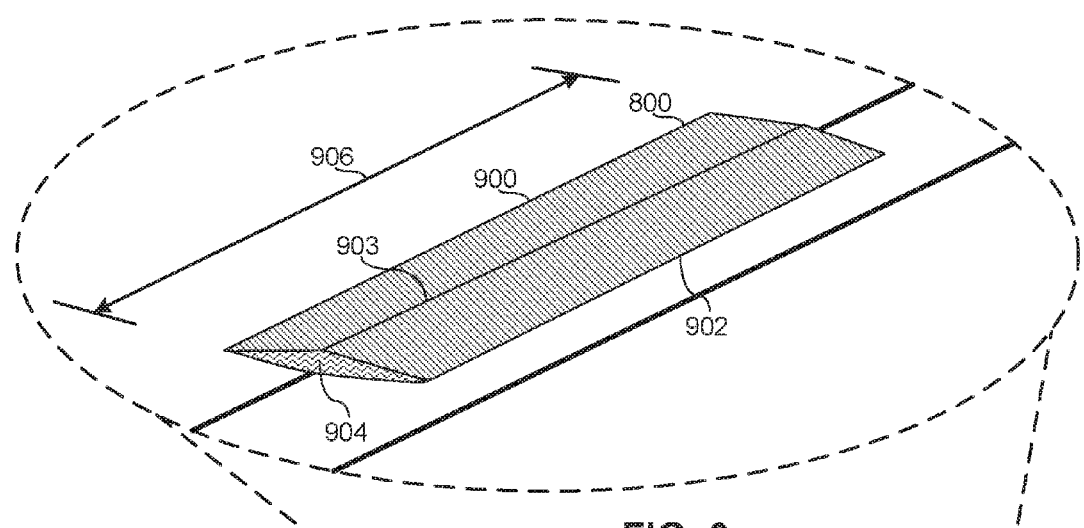
FIG. 9 is a magnified view of a portion of FIG. 8 including the example airfoil adjustment device of FIG. 8.

FIG. 9 is a magnified view of the example adjustment device 800 of FIG. 8. The example adjustment device 800 has a first edge 900, a second edge 902, and a third edge 903. The first edge 900 is positioned towards the leading edge 802 of the rotor blade 104a and the second edge 902 is positioned towards the trailing edge 208 of the rotor blade 104a. The third edge 903 is positioned between the first edge 900 and the second edge 902. The first edge 900 is sometimes referred to herein as a forward edge of the adjustment device 800. The second edge 902 is sometimes referred to herein as an aft edge of the adjustment device 800.

The example adjustment device 800 has a profile 904 that alters the airfoil of the rotor blade 104a when the example adjustment device 800 is mounted to the rotor blade 104a. By changing the airfoil of the rotor blade 104a, the profile of the example adjustment device 800 changes aerodynamic characteristic(s) of the rotor blade 104a such as, for example, pressure distribution(s) along the blade 104a and the pitching moment of the rotor blade 104a. The profile 904 of the example adjustment device 800 of FIGS. 8 and 9 is an example profile and the example adjustment devices disclosed herein can be designed and constructed to have alternative profiles depending on the desired alteration of the airfoil of the rotor blade 104a. In other words, any desirable profile of the adjustment devices disclosed herein is possible. Further, the example adjustment device 800 of FIGS. 8 and 9 has a length 906 along a longitudinal axis of the adjustment device 800. The length 906 of the adjustment device 800 can also be designed and constructed in accordance with particular changes desired for specific rotor blades.

Figure 10:
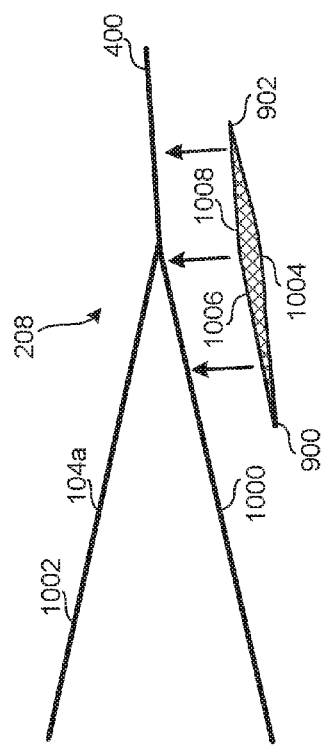
FIG. 10 is a cross-sectional view of the example airfoil adjustment device of FIGS. 8 and/or 9 at the trailing edge of the rotor blade of FIGS. 1-3.

FIG. 10 illustrates a placement of the example adjustment device 800 on a bottom surface 1000 of the rotor blade 104a. While FIG. 10 shows the example adjustment device 800 positioned on the bottom surface 1000 of the rotor blade 104a, the example adjustment device 800 can additionally or alternatively be placed on an upper surface 1002 of the rotor blade 104a. As shown in FIG. 10, the upper surface 1002 and the bottom surface 1000 taper towards an end of the trailing edge 208 of the rotor blade 104a. Without the example adjustment device 800 mounted to the rotor blade 104a, the example bottom surface 1000 of the trailing edge 208 tapers towards the end of the trailing edge 208 at a first angle until the bottom surface 1000 meets the upper surface 1002, which also tapers towards to the end of the trailing edge 208 at a second angle substantially similar (e.g., within a tolerance) to the first angle. As described below, the angular characteristics of the bottom surface 1000 of the trailing edge 208 are altered when the example adjustment device 800 is mounted to the rotor blade 104a. In the illustrated example of FIG. 10, the adjustment device 800 is mounted to the bottom surface 1000 such that the adjustment device 800 does not extend beyond the trim tab 400 extending from the trailing edge 208 of the rotor blade 104a. In some examples, the adjustment device 800 is mounted to the bottom surface 1000 such that the adjustment device 800 does not extend beyond the trailing edge 208 of the rotor blade 104a. In some examples, the adjustment device 800 is mounted such that the adjustment device 800 does extend beyond the trailing edge 208 of the rotor blade 104a. In some examples, the adjustment device 800 is mounted to a trim tab of the rotor blade 104a and/or other type(s) of tabs of the rotor blade 104a (e.g., a fixed tab). That is, the example adjustment device 800 can be mounted to the body of the rotor blade 104a and/or a tab of the rotor blade 104a (which may be integrally formed with the rotor blade 104a or removably mounted to the rotor blade 104a). In some examples, the adjustment device 800 is mounted such that the adjustment device 800 extends beyond the trailing edge 208 of the rotor blade but not beyond a tab (e.g., an adjustable trim tab and/or a fixed tab) of the rotor blade 104a. In the illustrated example of FIG. 10, a first contacting surface 1006 of the adjustment device 800 extends between the first edge 900 and a middle portion 1004 of the adjustment device 800, and a second contacting surface 1008 of the adjustment device 800 extends between the second edge 902 and the middle portion 1004 of the adjustment device. The first contacting surface 1006 is configured to be mounted to the bottom surface 1000 of the rotor blade 104a, and the second contacting surface 1008 is configured to be mounted to the trim tab 400 extending from the trailing edge 208 of the rotor blade 104a. Additionally and/or alternative configurations of the example adjustment 800 device are possible.

The example adjustment device 800 of FIG. 10 has a first thickness at the forward edge 900, a second thickness at the aft edge 902, and a third thickness at a middle portion 1004. The example adjustment device 800 has other thicknesses extending between the forward edge 900 and the middle portion 1004, as well as extending between the middle portion 1004 and the aft edge 902. The first thickness at the forward edge 900 and the second thickness at the aft edge 902, which are substantially similar, are less than the third thickness of the middle portion 1004.

The configuration of the thicknesses 900, 902 and 1004 gives the example adjustment device 800 a profile 904 significantly different than the profile of the trim tab 400 and the wedge 700 described above. In particular, the trim tab 400 has a uniform thickness. The wedge 700 has its greatest thickness at the aft edge of the wedge 700 that, as described above, considerably increases base drag of the rotor blade 104a. Unlike the wedge 700 of FIG. 7, the example adjustment device 800 of FIG. 10 has its greatest thickness in the middle portion 1004 of the device 800 and a lesser thickness at the aft edge 902 of the device 800. As a result, the example adjustment device 800 adjusts the airfoil (and, thus, pressure distributions along with blade 104a and the pitching moment of the blade 104a) without substantially (e.g., within a negligible threshold) increasing the drag of the rotor blade 104*a*, unlike excessive deflections of the trim tab 400 and the wedge 700.

Figure 11:
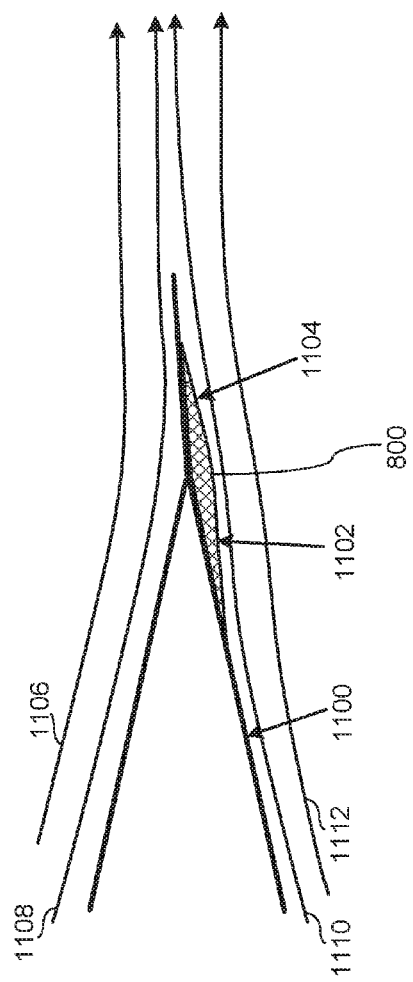
FIG. 11 is a cross-sectional view of the example airfoil adjustment device of FIGS. 8-10 coupled to the example rotor blade of FIGS. 1-3.

FIG. 11 illustrates how the example adjustment device 800 alters the airfoil of the rotor blade 104*a* while not substantially increasing drag. In particular, the example adjustment device 800 changes the contour of the bottom surface 1000 of the rotor blade 104*a*. Instead of extending towards the end of the trailing edge 208 at a straight, constant angle (as shown in FIG. 10), the bottom surface 1000 of the rotor blade 104*a* with the adjustment device 800 mounted thereto extends towards the end of the trailing edge 208 in a first direction for a first portion 1100, away from the end of the trailing edge 208 in a second direction (e.g., at a different angle than the first direction) for a second portion 1102, and back towards the end of the trailing edge 208 in the first direction for a third portion 1104. The first portion 1100 corresponds to the surface of the rotor blade 104*a* itself. The second portion 1102 corresponds to a surface of the example adjustment device 800 extending from the forward edge 900 of the device 800 to the middle portion 1004 of the device. The third portion 1104 corresponds to a surface of the example adjustment 800 extending from the middle portion 1004 of the device 800 to the aft edge 902 of the device 800. As shown by airflow lines 1106-1112 of FIG. 11, the configuration of the bottom surface 1000 of the rotor blade 104*a* created by the example adjustment device 800 changes the airfoil of the blade 104*a*, but does not add substantial drag to the blade 104*a*. Instead, the airflow lines 1106-1112 show that the streamlined characteristic of trailing edge 208 is maintained, thereby maintaining the minimal drag of the rotor blade 104*a*.

In the illustrated example, the surface of the adjustment device 800 extending from the forward edge 900 to the middle portion 1004 is referred to as a forward surface of the adjustment device 800. The surface of the adjustment device 800 extending from the middle portion 1004 to the aft edge 902 is referred to as a rear surface of the adjustment device 800. In some examples, the forward surface of the adjustment device 800 changes the pitching moment of the airfoil of the blade 104*a* and the rear surface of the adjustment device 800 reduces the effects of the drag of the blade 104*a* created by the forward surface. The example rear surface of the adjustment device 800 also changes the airfoil of the blade 104*a* and, at the same time, compensates for any potential increase in drag by maintaining the streamlining of the trailing edge 208. Depending on the specifics of the rotor blade on which the adjustment device 800 is implemented, the rear surface of the adjustment device 800 may completely eliminate (e.g., compensate for) the effects of the adjustment device 800 on the drag of the rotor blade 104*a*. Alternatively, the rear surface of the adjustment device 800 may significantly (e.g., almost entirely) reduce the effects of the adjustment device 800 on the drag of the rotor blade 104*a*.

Figure 12:
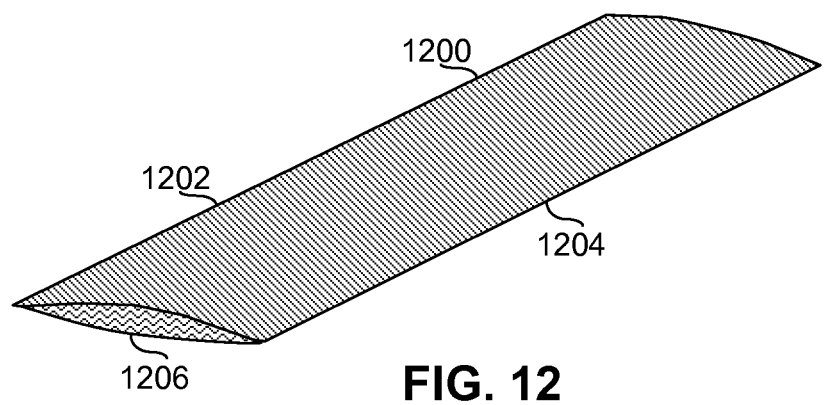
FIG. 12 illustrates another example airfoil adjustment device constructed in accordance with teachings of this disclosure.

FIG. 12 illustrates another example adjustment device 1200 constructed in accordance with the teachings of this disclosure. The example adjustment device 1200 of FIG. 12 includes a forward edge 1202 of a first thickness, an aft edge 1204 of a second thickness, and a middle portion 1206 of a third thickness. Like the example adjustment device 800 of FIGS. 8-11, the third thickness of the middle portion 1206 is greater than the first thickness of the forward edge 1202 and the second thickness of the aft edge 1204. The example adjustment device 1200 of FIG. 12 comes to an apex more gradually than the example adjustment device 800 of FIGS. 8-11. In other words, the example adjustment device 1200 of FIG. 12 transitions from the third thickness to the first and second thicknesses more gradually than the example adjustment 800 of FIGS. 8-11.

Figure 13:
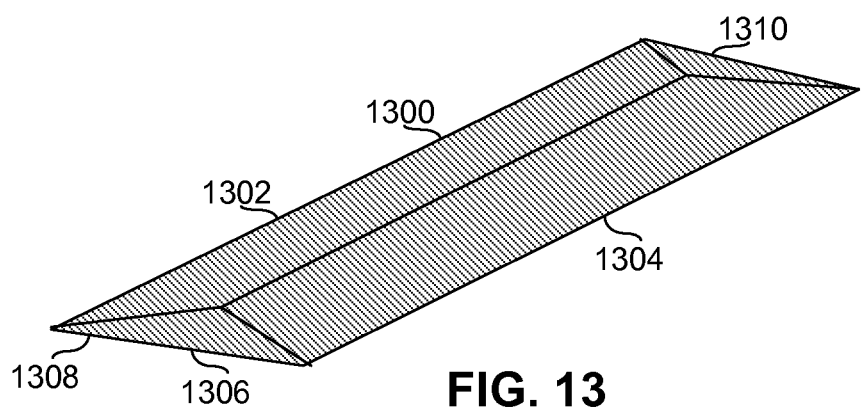
FIG. 13 illustrates another example airfoil adjustment device constructed in accordance with teachings of this disclosure.

FIG. 13 illustrates another example adjustment device 1300 constructed in accordance with the teachings of this disclosure. The example adjustment device 1300 of FIG. 13 includes a forward edge 1302 of a first thickness, an aft edge 1304 of a second thickness, and a middle portion 1306 of a third thickness. Like the example adjustment device 800 of FIGS. 8-11, the third thickness of the middle portion 1306 is greater than the first thickness of the forward edge 1302 and the second thickness of the aft edge 1304. The shape of ends 1308 and 1310 of the example adjustment device 1300 are different than the ends of the example adjustment device 800 of FIGS. 8-11. In the illustrated example of FIG. 13, the ends 1308 and 1310 of the adjustment device 1300 extend towards each other instead of being parallel as shown in the example adjustment device 800 of FIGS. 8-11.

Figure 14:
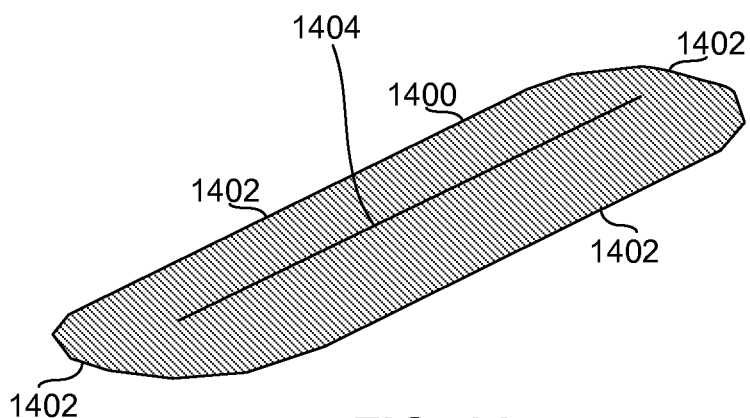
FIG. 14 illustrates another example airfoil adjustment device constructed in accordance with teachings of this disclosure.

FIG. 14 illustrates another example adjustment device 1400 constructed in accordance with the teachings of this disclosure. The example adjustment device 1400 of FIG. 14 has a first thickness around the edges 1402 of the adjustment device 1400 and a second thickness in a center portion 1404. Thus, the thickness of the example adjustment device 1400 increases from the forward edge of the device 800 to the middle portion 1404 and decreases from the middle portion 1404 to the aft edge of the device 800.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   means for adjusting a pitching moment of a rotor blade, the rotor blade including a leading edge, a trailing edge opposite the leading edge, a first surface, a second surface opposite the first surface, and a tab, the first and second surfaces extending from the leading edge to the trailing edge, the trailing edge being defined by a convergence of the first and second surfaces, the tab extending from the trailing edge, the means for adjusting the pitching moment including a forward edge, an aft edge, a middle portion, a third surface, and a fourth surface, the aft edge opposite the forward edge, the middle portion positioned between the forward and aft edges, the third surface extending from the forward edge to the middle portion, the third surface to be attached to the first surface of the rotor blade, the fourth surface extending from the middle portion to the aft edge, the fourth surface to be attached to the tab, the middle portion to be positioned immediately adjacent an intersection of the trailing edge and the tab, the tab to extend beyond the aft edge of the means for adjusting the pitching moment, when the means for adjusting the pitching moment is attached to the rotor blade.

2. An apparatus, comprising:
   a pitching moment adjustment attachment to be attached to a rotor blade of an aircraft, the rotor blade including a leading edge, a trailing edge opposite the leading edge, a first surface, a second surface opposite the first surface, and a tab, the first and second surfaces extending from the leading edge to the trailing edge, the trailing edge being defined by a convergence of the first and second surfaces, the tab extending from the trailing edge, the pitching moment adjustment attachment including a forward edge, an aft edge, a middle portion, a third surface, and a fourth surface, the aft edge opposite the forward edge, the middle portion positioned between the forward and aft edges, the third surface extending from the forward edge to the middle portion, the third surface to be attached to the first surface of the rotor blade, the fourth surface extending from the middle portion to the aft edge, the fourth surface to be attached to the tab, the middle portion to be positioned immediately adjacent an intersection of the trailing edge and the tab, the tab to extend beyond the aft edge of the pitching moment adjustment attachment when the pitching moment adjustment attachment is attached to the rotor blade, the pitching moment adjustment attachment being configured to change a pitching moment of the rotor blade when the pitching moment adjustment attachment is attached to the rotor blade.

3. An apparatus as defined in claim 2, wherein the forward edge has a first thickness, the middle portion has a second thickness, and the aft edge has a third thickness, the second thickness being greater than the first and third thicknesses, the first and third thicknesses being substantially similar.

4. An apparatus as defined in claim 2, wherein the pitching moment adjustment attachment is to reduce a base drag when the pitching moment adjustment attachment is attached to the rotor blade.

5. An apparatus as defined in claim 2, wherein a first length along a longitudinal axis of the pitching moment adjustment attachment is less than a second length along a longitudinal axis of the rotor blade to which the pitching moment adjustment attachment is to be attached, the longitudinal axis of the pitching moment adjustment attachment being substantially parallel to the longitudinal axis of the rotor blade.

6. An apparatus as defined in claim 5, wherein the first length of the pitching moment adjustment attachment is configured to change the pitching moment.

7. An apparatus as defined in claim 2, wherein the pitching moment adjustment attachment further includes a fifth surface, the fifth surface extending between the forward edge and the aft edge, the fifth surface facing away from the first surface of the rotor blade when the pitching moment adjustment attachment is attached to the rotor blade.

8. An apparatus as defined in claim 7, wherein the fifth surface includes a continuous curve between the forward edge and the aft edge.

9. An apparatus as defined in claim 2, wherein the pitching moment adjustment attachment further includes a fifth surface and a sixth surface, the fifth surface extending between the forward edge and the middle portion, the sixth surface extending between the middle portion and the aft edge, the fifth and sixth surfaces facing away from the first surface of the rotor blade when the pitching moment adjustment attachment is attached to the rotor blade, the fifth and sixth surfaces converging to define a third edge of the pitching moment adjustment attachment.

10. An apparatus as defined in claim 9, wherein the third edge is positioned closer to the aft edge than the forward edge.

11. An apparatus as defined in claim 9, wherein the third edge is positioned closer to the forward edge than the aft edge.

12. An apparatus as defined in claim 9, wherein the third edge is offset from a longitudinal axis of the pitching moment adjustment attachment.

13. An apparatus as defined in claim 9, wherein the fifth surface is configured to change the pitching moment of the rotor blade when the pitching moment adjustment attachment is attached to the rotor blade.

14. An apparatus as defined in claim 13, wherein the sixth surface is configured to reduce a base drag when the pitching moment adjustment attachment is attached to the rotor blade.

15. An apparatus, comprising:
a rotor blade including a leading edge, a trailing edge opposite the leading edge, a first surface, a second surface opposite the first surface, and a tab, the first and second surfaces extending from the leading edge to the trailing edge, the trailing edge being defined by a convergence of the first and second surfaces, the tab extending from the trailing edge; and
a pitching moment adjustment attachment attached to the rotor blade, the pitching moment adjustment attachment including a forward edge, an aft edge, a middle portion, a third surface, and a fourth surface, the aft edge opposite the forward edge, the middle portion positioned between the forward and aft edges, the third surface extending from the forward edge to the middle portion, the third surface being attached to the first surface of the rotor blade, the fourth surface extending from the middle portion to the aft edge, the fourth surface being attached to the tab, the middle portion being positioned immediately adjacent an intersection of the trailing edge and the tab, the tab extending beyond the aft edge of the pitching moment adjustment attachment, the pitching moment adjustment attachment being configured to change a pitching moment of the rotor blade.

16. An apparatus as defined in claim 15, wherein the forward edge has a first thickness, the middle portion has a second thickness, and the aft edge has a third thickness, the second thickness being greater than the first and third thicknesses, the first and third thicknesses being substantially similar.

17. An apparatus as defined in claim 15, wherein the pitching moment adjustment attachment is removably attached to the rotor blade.

18. An apparatus as defined in claim 15, wherein a first length along a longitudinal axis of the pitching moment adjustment attachment is less than a second length along a longitudinal axis of the rotor blade to which the pitching moment adjustment attachment is attached, the first length of the pitching moment adjustment attachment configured to change the pitching moment.

19. An apparatus as defined in claim 15, wherein the pitching moment adjustment attachment further includes a fifth surface and a sixth surface, the fifth surface extending between the forward edge and the middle portion, the sixth surface extending between the middle portion and the aft edge, the fifth and sixth surfaces facing away from the first surface of the rotor blade and converging to define a third edge of the pitching moment adjustment attachment.

20. An apparatus as defined in claim 19, wherein the third edge is offset from a longitudinal axis of the pitching moment adjustment attachment.

21. An apparatus as defined in claim 19, wherein the fifth surface is configured to change the pitching moment of the rotor blade.

22. An apparatus as defined in claim 21, wherein the sixth surface is configured to reduce a base drag.

23. An apparatus, comprising:
an aircraft;

a rotor blade attached to the aircraft, the rotor blade including a leading edge, a trailing edge opposite the leading edge, a first surface, a second surface opposite the first surface, and a tab, the first and second surfaces extending from the leading edge to the trailing edge, the trailing edge being defined by a convergence of the first and second surfaces, the tab extending from the trailing edge; and a pitching moment adjustment attachment attached to the rotor blade, the pitching moment adjustment attachment including a forward edge, an aft edge opposite the forward edge, a middle portion positioned between the forward and aft edges, a third surface, and a fourth surface, the third surface extending from the forward edge to the middle portion, the third surface being attached to the first surface of the rotor blade, the fourth surface extending from the middle portion to the aft edge, the fourth surface being attached to the tab, the middle portion being positioned immediately adjacent an intersection of the trailing edge and the tab, the tab extending beyond the aft edge of the pitching moment adjustment attachment, the forward edge having a first thickness, the middle portion having a second thickness, the aft edge having a third thickness, the second thickness being greater than the first thickness, the second thickness being greater than the third thickness, the pitching moment adjustment attachment being configured to change a pitching moment of the rotor blade.

\* \* \* \* \*